Oct. 26, 1948.　　　　　　E. L. HARLEY　　　　　　2,452,373
METHOD OF AND MEANS FOR REGISTERING FLAT BED COLOR
PRINTING ELEMENTS WITH THEIR
FIXED REGISTRY ELEMENTS
Filed May 15, 1947　　　　　　　　　　　　　　3 Sheets-Sheet 3
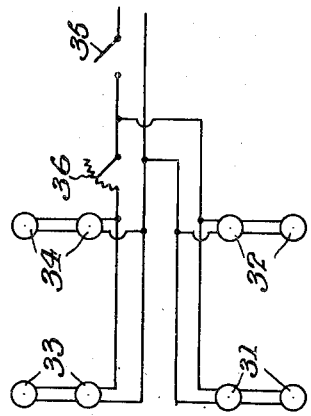
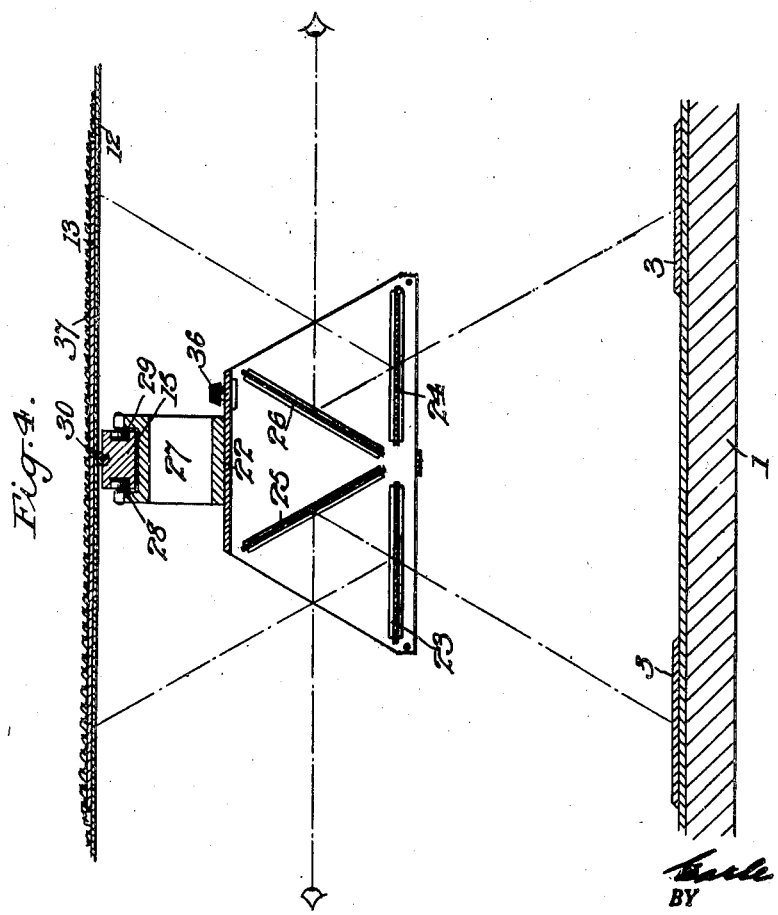
INVENTOR.
Earle L. Harley
BY
ATTORNEYS Patented Oct. 26, 1948

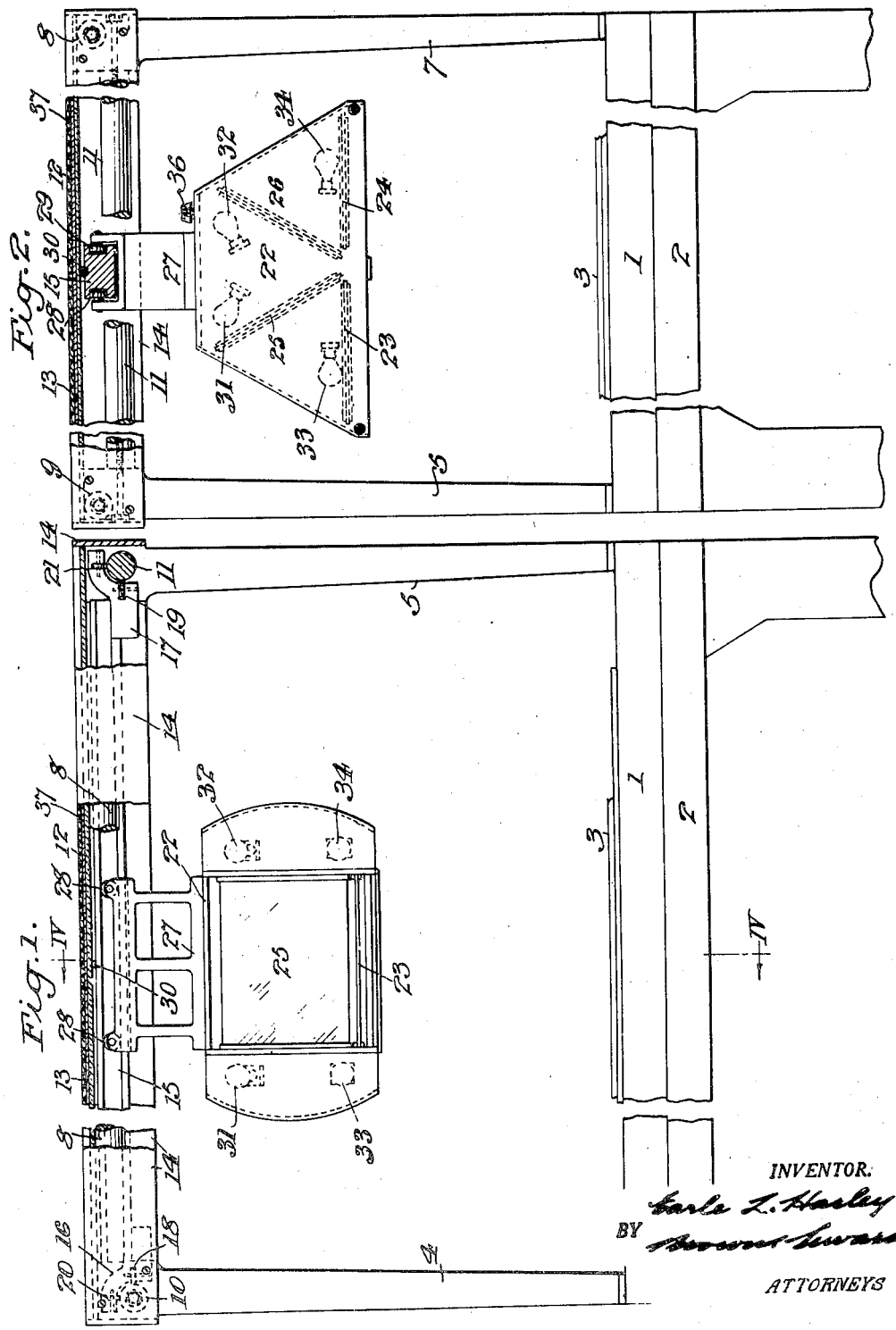

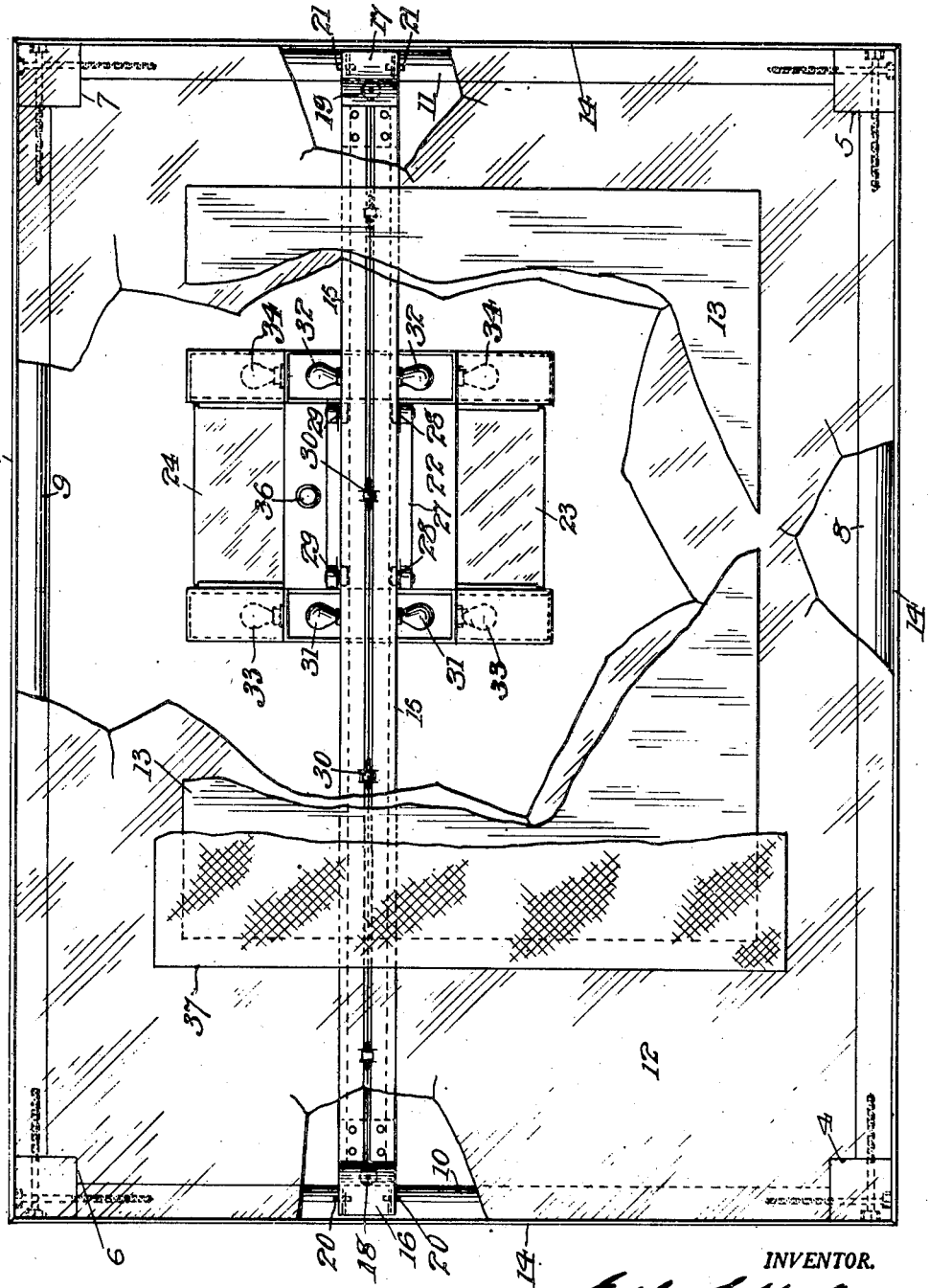

2,452,373

UNITED STATES PATENT OFFICE 2,452,373

METHOD OF AND MEANS FOR REGISTERING FLAT BED COLOR PRINTING ELEMENTS WITH THEIR FIXED REGISTRY ELEMENTS

Earle L. Harley, Brooklyn, N. Y., assignor to H. H. Heinrich, Inc., New York, N. Y., a corporation of New York Application May 15, 1947, Serial No. 748,166

14 Claims. (Cl. 101—401.2)

My invention is directed to a novel and efficient method of and means for registering with the utmost accuracy, and by optical assistance, flat bed color printing elements with their fixed registry elements.

My invention includes a machine provided with a lower horizontal support for the printing elements, an upper horizontal support for the registry elements, a pair of horizontal bars disposed crosswise of the machine, a horizontal beam disposed longitudinally of the machne and slidable on the crossbars, a double mirror unit slidable along the beam: the double mirror unit and the beam being movable in horizontal planes between the printing and registry elements.

My invention also includes the provision of anti-friction bearings between the double mirror unit and its supporting beam and between the beam and its supporting crossbars; for not only facilitating the easy movements of the beam and the mirror unit but also to ensure the elimination of all lost motion.

My invention also includes anti-friction bearings located between the longitudinally disposed beam and the upper support for the registry elements, for preventing any deflection of the upper support which would cause an inaccurate reflection of the image of the registry elements carried thereby.

My invention also includes a special form of double mirror unit comprising oppositely disposed sets of coacting horizontal and angularly disposed mirrors, the horizontal mirrors being transparent and the angular mirrors being non-transparent, whereby each angularly disposed non-transparent mirror will reflect to the eye of an observer combined images of coacting portions of the printing and registry elements; the images of the printing elements being received on the angular mirrors directly from the printing elements through the horizontal transparent mirrors and the images of the registry elements being received by reflection from the said horizontal transparent mirrors.

My invention also includes certain novel features in the machine for producing the results set forth.

A machine for carrying out my novel method is represented in the accompanying drawings in which Fig. 1 represents a front elevation of the machine, certain parts being broken away;

Fig. 2 represents an end elevation, certain parts being broken away;

Fig. 3 represents a top plan view with the registry elements and their support broken away;

Fig. 4 represents a detailed vertical section taken in the plane of the line IV-IV of Fig. 1 and Fig. 5 represent a diagrammatic layout of the lighting system for the double mirror unit.

The machine for carrying out the method may be constructed, arranged and operated as follows:

The horizontal imposing table 1 surmounts a suitable base 2 for positioning the table at the desired height for convenient use. This imposing table forms a suitable support for the required number of flat color printing plates 3, which plates are movable to different positions thereon for registry purposes as will be hereinafter explained.

A frame uprises from the imposing table 1 which frame is shown as being provided with four corner uprights, 4, 5, 6 and 7 suitably secured at their bases to the said table. This frame at its top is also provided with two longitudinal tie bars 8 and 9 extending between the two front uprights 4, 5 and the two back uprights 6, 7 respectively. This frame is also at its top provided with two fixed tie bars 10, 11 which extend across the frame at its ends between the front and back uprights 4, 5 and 6, 7 respectively.

A plate 12 of glass or other rigid transparent material is arranged parallel to and above the imposing table 1, and it is supported along its front and back edges on the longitudinal tie bars 8 and 9 and at its corners on the corner uprights 4, 5, 6 and 7 of the frame. This transparent plate 12 serves as a support for the make-up detail or proof sheet 13 which contain the fixed registry elements coresponding to the printing plates 3 to be registered thereby.

A boundary apron 14 extends around the frame at its top and projects slightly above the transparent plate 12 and its make-up detail or proof sheet 13.

A longitudinally disposed I-beam 15 acts as a sliding hanging support for the double mirror unit to be immediately described, which I-beam is provided at its ends with hook members 16, 17 slidably mounted on crossbars 10 and 11 respectively.

Horizontally and vertically disposed anti-friction bearings 18, 19 and 20, 21 are located between the hook members 16 and 17 respectively and their crossbars 10 and 11 to not only facilitate the lateral movement of the I-beam along the crossbars but also to eliminate all loss of motion at these points.

A double mirror unit is suspended from the longitudinally disposed and laterally adjustable I-beam 15 between the printing and registry elements and this unit is shown as comprising a housing 22 in which there are located two oppositely disposed sets of transparent and non-transparent mirrors; the horizontally disposed transparent mirrors 23 and 24 serving to coact with their respectively angularly disposed non-transparent mirrors 25 and 26.

It will be understood that the front and back of this housing 22 are open to permit the unobstructed reflections in opposite directions of the images of corresponding surfaces of the printing and registry elements and also the unobstructed view of the non-transparent mirror of each set of mirrors, by the eye of the observer.

The means which I have shown for suspending the mirror unit from the I-beam 15 is constructed and arranged as follows:

The hanger 27 surmounts the housing 22 and its top embraces the bottom flanges of the I-beam 15. Two pairs of anti-friction bearings 28, 28 and 29, 29 are located between the bottom flanges of the beam and the hanger 27 for facilitating the movement of the double mirror unit along the beam and also for preventing any lost motion between the housing and the beam thus lending great rigidity to the double mirror unit.

Any deflection of the transparent plate 12 which would cause a distortion of the combined images of the registry and printing elements is eliminated by the provision of anti-friction bearings 30 located at intervals along the I-beam in contact with the underside of the said transparent plate.

An electric lighting system may be provided for illuminating both the registry elements and the printing elements, said system being shown herein as comprising two sets of upper and lower lamps 31, 32 and 33, 34 in the housing 22 within open-ended channels for directing the light to the registry and printing elements respectively without exposing the lamps to the eye of the observer. Any well-known and approved circuit as that illustrated in Fig. 5 may be provided, and it includes a hand switch 35, and also a rheostat 36 for controlling the lower lamps of the lighting system.

A suitable cover, as a canvas sheet 37 may be placed over the fixed registry sheet 13 to hold it flat on the transparent plate 12 in its proper position over the printing elements 3.

In carrying out my method the make-up detail or proof sheet 13 bearing the registry elements is placed on the transparent plate 12. The printing plates which bear the coacting printing elements of one color may then be placed one at a time on the imposing table 1, and the double mirror unit and the printing plate may then be moved until the image of the combined images of the coacting registry and printing elements are reflected in proper register by one of the angular non-transparent mirrors to the eye of the observer. The plate may then be fastened securely in the usual chase. The same procedure is repeated until all of the printing plates have been accurately registered and secured. The chase may then be removed to the printing press and the plates of another color may be registered as before described and so on until the plates of all of the colors have been accurately registered.

It will be seen that by the use of the double mirror unit movable both lengthwise and crosswise of the machine, all of the printing plates may be registered by the use of both the mirror sets; thereby materially reducing the extent of movement of the several parts and also the time consumed in such registering operations.

It is evident that the method of registering the printing elements may be accomplished by other machines than the one shown and described herein. It is also evident that various changes may be made in the construction, form and arrangement of the several parts of the machine shown and described herein without departing from the spirit and scope of my invention.

What I claim is:

1. The method of registering flat bed color printing elements with fixed registry elements comprising arranging a double mirror unit having two oppositely disposed sets of coacting horizontal transparent and angular non-transparent mirrors between the printing and registry elements in position to cause a non-transparent mirror to receive the image of the registry element by reflection from the transparent mirror and to receive the image of a coacting printing element directly through the transparent mirror, the said non-transparent mirror reflecting the combined images to the eye of an observer, and moving the printing elements parallel to the registry elements to bring the images of the printing elements into accurate register with the reflected images of their registry elements on the non-transparent mirrors.

2. The method according to claim 1 which also includes moving the double mirror unit longitudinally between and parallel to the printing and registry elements into position to cause each of the non-transparent mirrors to reflect different combined images.

3. The method according to claim 1 which also includes moving the double mirror unit laterally between and parallel to the printing and registry elements into position to cause each of the non-transparent mirrors to reflect different combined images.

4. The method according to claim 1 which also includes moving the double mirror unit longitudinally and laterally between and parallel to the printing and registry elements into position to cause each of the non-transparent mirrors to reflect different combined images.

5. In a machine for registering flat bed color printing elements with fixed registry elements, parallel horizontal supports for the printing and registry elements, a double mirror unit, a support therefor, said double mirror unit having two oppositely disposed sets of coacting horizontal transparent and angular non-transparent mirrors, each non-transparent mirror being arranged in position to receive the image of a registry element by reflection from its transparent mirror and the image of a coacting printing element directly through the transparent mirror, the combined images of the corresponding surfaces of said elements being reflected by said non-transparent mirrors to the eye of an observer, the printing elements being movable parallel to the registry elements to bring the images of the printing elements into accurate register with the reflected images of the registry elements on the non-transparent mirrors.

6. In a machine for registering flat bed color printing elements with fixed registry elements, horizontal supports for the printing and registry elements, a double mirror unit, a support therefor, said double mirror unit having two oppositely disposed sets of coacting horizontal transparent and angular non-transparent mirrors, each set being arranged in position to receive the image of a registry element by reflection from its transparent mirror and the image of a coacting printing element directly through the transparent mirror, combined images of corresponding surfaces of said elements being reflected by each of said non-transparent mirrors to the eye of an observer, the printing elements being movable parallel to the registry elements to bring the images of the printing elements into accurate register with the reflected images of the registry elements on the non-transparent mirrors, and means for moving the double mirror unit longitudinally between and parallel to the printing and registry elements.

7. In a machine for registering flat bed color printing elements with fixed registry elements, horizontal supports for the printing and registry elements, a double mirror unit, a support therefor, said double mirror unit having two oppositely disposed sets of coacting horizontal transparent and angular non-transparent mirrors each non-transparent mirror being arranged in position to receive the image of a registry element by reflection from the transparent mirror and the image of a coacting printing elements directly through the transparent mirror, combined images of corresponding surfaces of said elements being reflected by each of said non-transparent mirrors to the eye of an observer, the printing elements being movable parallel to the registry elements to bring the images of the printing elements into register with the reflected images of the registry elements on the non-transparent mirrors, and means for moving the double mirror unit laterally between and parallel to the printing and registry elements.

8. In a machine for registering flat bed color printing elements with fixed registry elements, horizontal supports for the printing and registry elements, a double mirror unit, a support therefor, said double mirror unit having two oppositely disposed sets of coacting horizontal transparent and angular non-transparent mirrors each non-transparent mirror being arranged in position to receive the image of a registry element by reflection from the transparent mirror and the image of a coacting printing element directly through the transparent mirror, combined images of corresponding surfaces of each of said elements being reflected by each of said non-transparent mirrors to the eye of an observer, the printing elements being movable parallel to the registry elements to bring the images of the printing elements into register with the reflected images of the registry elements on the non-transparent mirrors, and means for moving the double mirror unit longitudinally and laterally between and parallel to the printing and registry elements.

9. In a machine for registering flat bed color printing elements with fixed registry elements, a horizontal table for movably positioning the flat printing elements, a frame uprising from the table, a horizontal transparent support for the registry element carried by the frame, a double mirror unit having two oppositely directed sets of mirrors located between said printing and registry elements comprising two horizontal transparent mirrors and two non-transparent angularly disposed mirrors, and means for slidably supporting the double mirror unit.

10. A machine according to claim 9 in which said means comprises two parallel crossbars, a longitudinally disposed beam slidable laterally thereon, and a double mirror unit slidable along the beam.

11. A machine according to claim 9 in which said means comprises two parallel crossbars, a longitudinally disposed beam slidable laterally thereon, a double mirror unit slidable along the beam, and anti-friction bearings located between the crossbars and the beam.

12. A machine according to claim 9 in which said means comprises two parallel crossbars, a longitudinally disposed beam slidable laterally thereon, a double mirror unit slidable along the beam, and anti-friction bearings located between the crossbars and the beam and also between the double mirror unit and the said beam.

13. A machine according to claim 9 in which said means comprises two parallel crossbars, a longitudinally disposed beam slidable laterally thereon, and a double mirror unit slidable along the beam, and anti-friction bearings carried by the beam in position to prevent deflection of the said horizontal transparent support for the registry elements.

14. A machine according to claim 9 in which said means comprises two parallel crossbars, a longitudinally disposed beam slidable laterally thereon, a double mirror unit slidable along the beam, anti-friction bearings carried by the beam in position to prevent deflection of the said horizontal transparent support for the registry elements, bearings located between the crossbars and the longitudinally disposed beam and anti-friction bearings located between the double mirror unit and the said beam.

EARLE L. HARLEY.

No references cited.